(12) United States Patent
Ruybal

(10) Patent No.: US 9,801,366 B2
(45) Date of Patent: Oct. 31, 2017

(54) FOLD OUT FISHING CHAIR

(71) Applicant: Calvin Robert Ruybal, Pueblo, CO (US)

(72) Inventor: Calvin Robert Ruybal, Pueblo, CO (US)

( * ) Notice: Subject to any disclaimer, the term of this patent is extended or adjusted under 35 U.S.C. 154(b) by 63 days.

(21) Appl. No.: 14/729,110

(22) Filed: Jun. 3, 2015

(65) Prior Publication Data

US 2016/0353727 A1 Dec. 8, 2016

(51) Int. Cl.

| | | |
|---|---|---|
| *A01K 97/22* | (2006.01) | |
| *A47C 1/14* | (2006.01) | |
| *A47C 4/00* | (2006.01) | |
| *A47C 7/66* | (2006.01) | |
| *A47C 7/72* | (2006.01) | |
| *A47C 4/28* | (2006.01) | |
| *A47C 7/68* | (2006.01) | |

(52) U.S. Cl.
CPC .............. *A01K 97/22* (2013.01); *A47C 4/286* (2013.01); *A47C 7/66* (2013.01); *A47C 7/68* (2013.01); *A47C 7/725* (2013.01)

(58) Field of Classification Search
CPC .......... A01K 97/22; A47C 7/68; A47C 4/286; A47C 7/66; A47C 7/725
USPC ........ 297/45, 184.1, 184.11, 184.15, 188.01, 297/188.02, 188.08, 188.12, 188.2, 297/188.21, 423.26, 423.27, 423.3
See application file for complete search history.

(56) References Cited

U.S. PATENT DOCUMENTS

| | | | | |
|---|---|---|---|---|
| 1,939,568 | A * | 12/1933 | Panhorst | A47C 1/0265 297/28 |
| 2,037,945 | A * | 4/1936 | Stockil | A47C 4/40 297/18 |
| 2,561,886 | A * | 7/1951 | Rikelman | A47C 4/42 297/357 |
| 2,600,374 | A * | 6/1952 | O'Neill | A47C 1/143 29/428 |
| 2,681,099 | A * | 6/1954 | Vallone | A47C 1/035 297/31 |
| 2,964,097 | A * | 12/1960 | Moore | A47C 1/0265 297/28 |
| 3,029,104 | A * | 4/1962 | Panicci | A47C 4/26 297/35 |
| 4,085,686 | A * | 4/1978 | Turner | A01K 97/22 108/25 |

(Continued)

*Primary Examiner* — David R Dunn
(74) *Attorney, Agent, or Firm* — The Keys Law Firm PLLC

(57) ABSTRACT

A fold out fishing chair for providing an easily portable seating and rod holding apparatus that provides shade for daytime fishing and illumination for nighttime fishing. The fold out fishing chair includes a base seat with an integral holder assembly and an integral shade assembly, each of which can be selectively moved into a deployed position. The holder assembly defines a fold out fishing rod holding structure that can hold fishing rods at a desirable angle without requiring ongoing user attention. The shade assembly includes a roll out shade having integrated lighting elements so as to improve comfort in direct sunlight and low lighting conditions. The holder assembly and shade assembly can both be moved to a retracted position in which the base seat can be folded into a closed configuration sized substantially the same as a folded conventional fold out chair.

20 Claims, 6 Drawing Sheets

(56) References Cited

U.S. PATENT DOCUMENTS

| | | | | |
|---|---|---|---|---|
| 4,426,115 | A * | 1/1984 | Bissonnette | A47C 7/506 297/423.27 |
| 4,460,216 | A * | 7/1984 | Keller | A01K 97/22 248/416 |
| 4,645,167 | A * | 2/1987 | Hardwick | B63B 29/04 248/283.1 |
| 4,835,896 | A * | 6/1989 | Bowen | A01K 97/22 248/214 |
| 5,061,011 | A * | 10/1991 | Miller | A47C 1/143 297/423.27 |
| 5,330,251 | A * | 7/1994 | McGuire | B60R 7/08 160/370.22 |
| 5,582,458 | A * | 12/1996 | Wildt | A47C 1/143 297/183.5 |
| 5,797,650 | A * | 8/1998 | Gonzalez, Jr. | A47C 7/66 297/184.1 |
| 5,987,804 | A * | 11/1999 | Shearer | A01K 97/10 43/21.2 |
| 6,209,951 | B1 * | 4/2001 | Han | A47C 4/286 297/188.14 |
| 6,264,271 | B1 * | 7/2001 | Munn | A47C 4/286 297/372 |
| 6,629,722 | B1 * | 10/2003 | Tang | A47C 7/62 297/188.08 |
| 6,808,231 | B1 * | 10/2004 | Hill | B60R 9/06 296/26.09 |
| 7,025,418 | B1 * | 4/2006 | Hackal | A47C 15/006 297/184.1 |
| 7,047,688 | B2 * | 5/2006 | Sandman, Jr. | A01K 97/10 248/512 |
| 7,118,172 | B1 * | 10/2006 | Pattison-Sheets | A45F 4/02 224/155 |
| 7,210,738 | B1 * | 5/2007 | Mahaffy | B60N 2/60 297/184.1 |
| 7,243,990 | B1 * | 7/2007 | Wahl | A47C 7/66 297/184.15 |
| 7,374,247 | B2 * | 5/2008 | Welsh | A47C 7/52 297/423.19 |
| 7,431,388 | B2 * | 10/2008 | Sharapov | A47C 1/14 297/184.11 |
| 7,562,930 | B1 * | 7/2009 | Rondeau | A47C 7/66 297/184.16 |
| 7,648,196 | B2 * | 1/2010 | Degelman | A47C 4/286 297/184.1 |
| 7,740,310 | B1 * | 6/2010 | Forster | A47C 1/143 135/96 |
| 7,753,441 | B1 * | 7/2010 | Gray, Jr. | A01K 97/10 297/188.01 |
| 8,002,349 | B1 * | 8/2011 | Pizzuto | A47C 1/143 297/184.11 |
| 8,091,962 | B2 * | 1/2012 | Quinn | A45B 11/00 297/184.16 |
| 8,585,135 | B2 * | 11/2013 | Wilson | A47C 1/024 297/354.12 |
| 8,789,884 | B1 * | 7/2014 | Edelman | A47C 7/62 297/188.08 |
| 8,864,221 | B1 * | 10/2014 | Delvilla | A47C 7/62 297/180.11 |
| 8,919,871 | B2 * | 12/2014 | Huntsberger | A47D 1/02 297/184.13 |
| 2005/0067864 | A1 * | 3/2005 | Anglin | A47C 4/04 297/217.1 |
| 2006/0054207 | A1 * | 3/2006 | Wootliff | A47C 29/003 135/96 |
| 2007/0040422 | A1 * | 2/2007 | Reeb | A47C 7/66 297/184.1 |
| 2010/0253118 | A1 * | 10/2010 | Gressette, III | A01M 31/02 297/188.01 |
| 2011/0175407 | A1 * | 7/2011 | Sharapov | A47C 7/66 297/184.15 |
| 2014/0252817 | A1 * | 9/2014 | Lovley, II | A47C 4/286 297/184.15 |
| 2015/0042144 | A1 * | 2/2015 | Frankel | A47C 1/14 297/423.3 |

* cited by examiner ly. The fold out fishing chair 100 additionally

FOLD OUT FISHING CHAIR

DETAILED DESCRIPTION OF THE INVENTION

Figure 1:
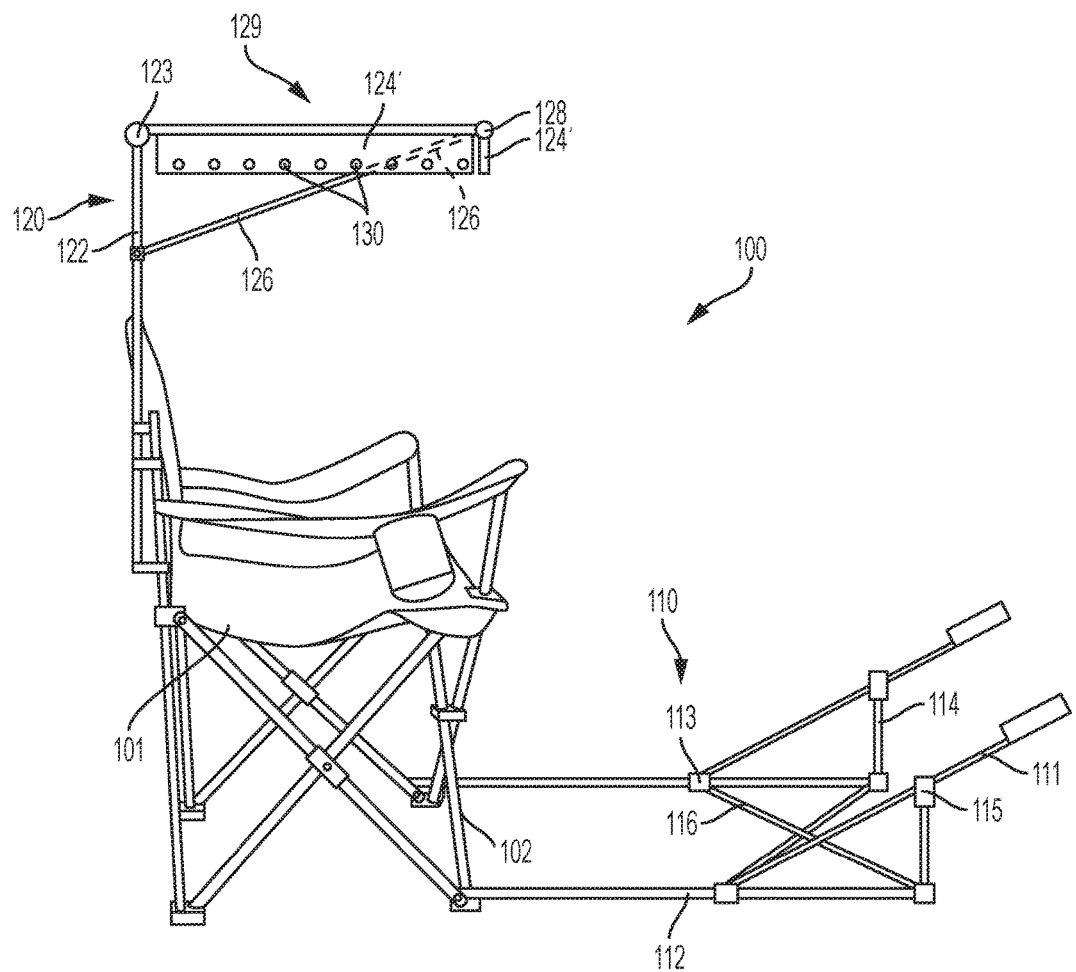
FIG. 1 is a side perspective view of a fold out fishing chair built in accordance with the present invention shown in an open configuration with its shade and holder assemblies each in a deployed position.
Figure 2:
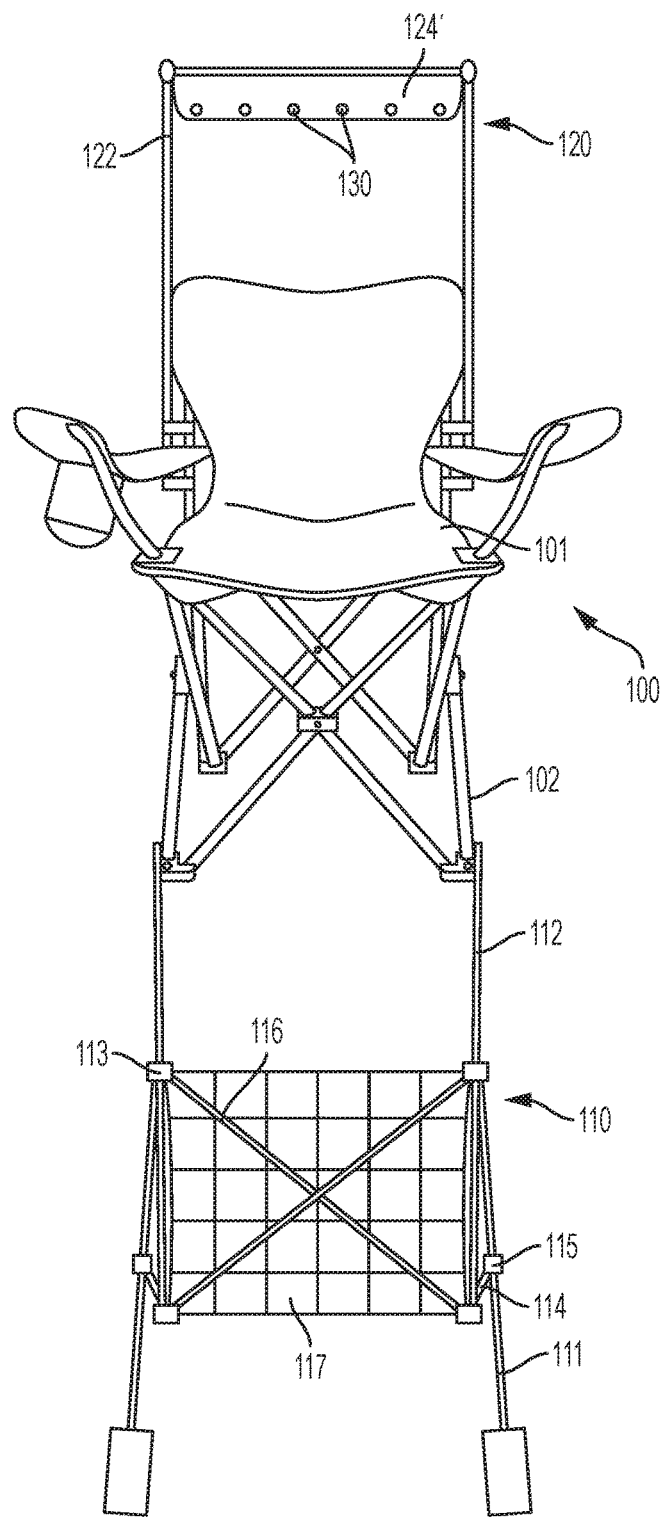
FIG. 2 is a front perspective view of a fold out fishing chair built in accordance with the present invention shown in an open configuration with its shade and holder assemblies each in a deployed position.
Figure 3:
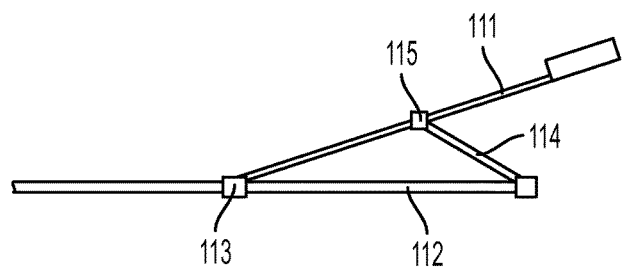
FIG. 3 is a partial side elevational view of a holder assembly of a fold out fishing chair built in accordance with the present invention shown in a deployed position.
Figure 4:
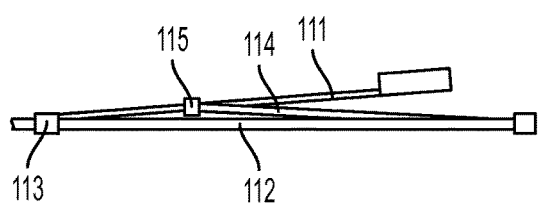
FIG. 4 is a partial side elevational view of a holder assembly of a fold out fishing chair built in accordance with the present invention shown in a retracted position.

Referring now to the drawings and in particular FIGS. 1 and 2, a fold out fishing chair 100 is shown in its open configuration in which it is suitable for a user to be seated. Similar to conventional foldout chairs (or "folding camping chairs"), the fold out fishing chair 100 built in accordance with the present invention includes a base seat 101 that is selectively configurable in this open configuration as well as a narrow, closed configuration suitable for storage and transportation. The fold out fishing chair 100 additionally includes an integral holder assembly 110 and an integral shade assembly 120, each of which can be moved between a deployed position and a retracted position. When in use, it is contemplated that the shade assembly 120 and holder assembly 110 would be maintained in their respective retracted positions while the fold out fishing chair 100 is in its closed configuration and may be selectively moved to their respective deployed positions when the fold out fishing chair 100 is in its open configuration, as desired by a user.

Referring now to FIGS. 1, 2, 3, 4, 5, 6, and 10, the holder assembly 110 defines a pair of fold out fishing rod holders 111 that are each positioned on a holder extension 112 so as to hold a conventional fishing rod upright, angulared away from base seat 101 when the holder assembly 110 is in its deployed position. The proximal end of each holder extension 112 is hingedly attached to respective front legs 102 of the base seat 101, thereby enabling the holder extension 112 to swing between a horizontal position illustrated by FIGS. 1 and 2 and a vertical position illustrated by FIG. 10. The rod holders 111 are each connected to the holder extension 112 through an extension slider 113 that slides horizontally along the holder extension 112 and a holder support leg 114 that extends from the distal end of the holder extension 112 relative to the base seat 101. As the extension slider 113 moves away from the base seat 101, the associated rod holder 111 is moved up into an elevated position illustrated in FIG. 3. As the extension slider 113 moves towards the base seat 101, the associated rod holder 111 is moved down into a level position illustrated in FIG. 4. The holder support leg 114 is connected to the rod holder 111 through a holder slider 115 that slides along the rod holder 111 so as to provide added support as the rod holder 111 moves between the elevated position and level position and when the rod holder 111 is fixed in the elevated position.

It is contemplated that either the extension sliders 113 or the holder sliders 115 (or both) include clamp fasteners so as to enable the to be selectively fixed in place by a user to hold the rod holders 111 in a desired position.

Figure 5:
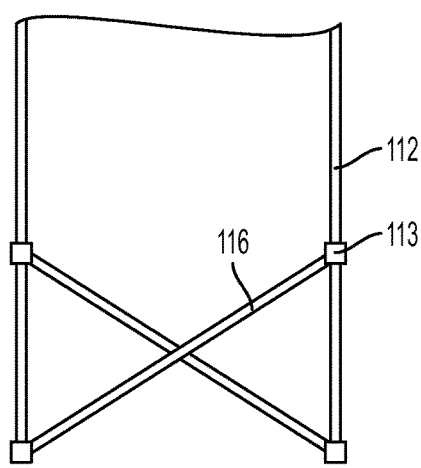
FIG. 5 is a partial bottom plan view of a holder assembly of a fold out fishing chair built in accordance with the present invention shown in a spaced position.
Figure 6:
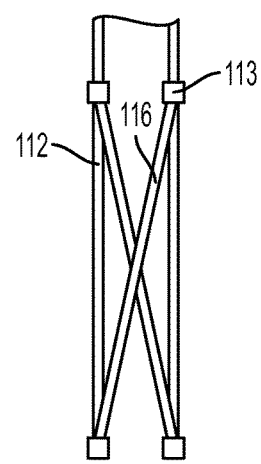
FIG. 6 is a partial bottom plan view of a holder assembly of a fold out fishing chair built in accordance with the present invention shown in a narrow position.

Connecting the two holder extensions 112 are two intersecting holder connectors 116. The holder connectors 116 are each fixed at one end to the distal end of one of the holder extensions 112 and at the other end to the extension slider 113 on the opposite holder extension 112. Accordingly, sliding the extension sliders 113 along the holder extensions 112 away from the base seat 111 causes the holder connectors 116 to be moved in a direction that moves the holder extensions 112 away from one another into a spaced position, as illustrated in FIG. 5. Conversely, as the extensions sliders 113 are moved towards the base seat 101, the holder connectors 116 are moved in a direction which causes the holder extensions 112 move closer together into a narrow position, as illustrated in FIG. 6.

As such, the extension sliders 113 on each holder extension 112 are central to the movement of the respective rod holders 111 between the elevated position and level position as well as the respective holder extensions 112 between the spaced position and narrow position. It is appreciated that when the rod holders 111 are in the elevated position and the holder extensions 112 are in the spaced position, the holder assembly 110 has an angled holding apparatus and a sturdy base that enables it to hold and support conventional fishing rods. Similarly, as when the rod holders 111 are in the level position and the holder extensions 112 are in the narrow position, the holder assembly 110 defines a narrow, compact structure that, when placed against the legs 102 of the base seat 101, can be easily stored with the folded base seat 101.

In one embodiment, the holder assembly 110 includes a tackle box holding net 117 disposed over the holder connectors 116.

Referring now to FIGS. 1, 2, 7, 8, 9, and 10, the shade assembly 120 includes a roll out shade device 121 removably attachable at each end to a telescoping shade pole 122. Each shade pole 122 is attached to one side of the base seat 101. In the preferred embodiment, each shade pole 122 is lashed to the side bar that defines the edge of the seat back of the base seat 101 in two locations.

Figure 10:
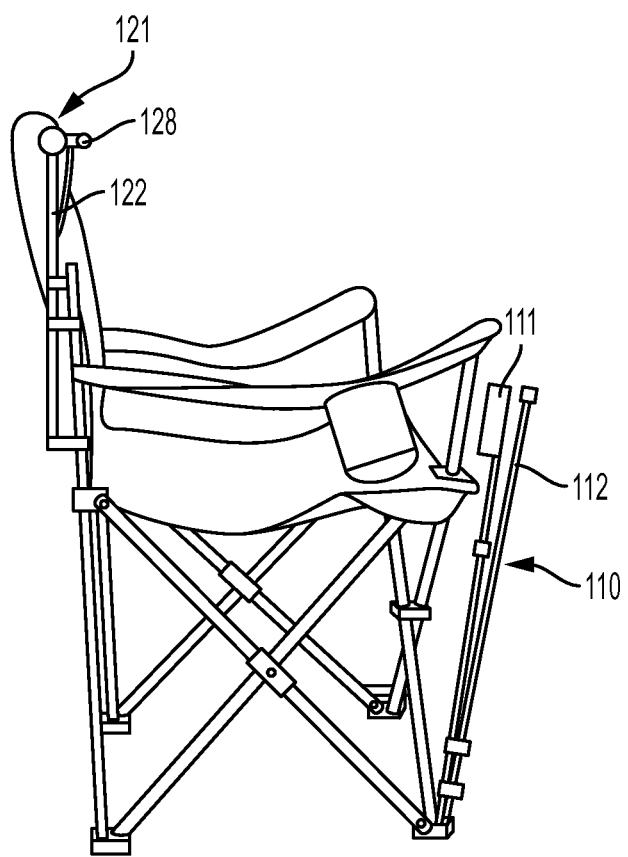
FIG. 10 is side perspective view of a fold out fishing chair built in accordance with the present invention shown in an open configuration with its shade and holder assemblies each in a retracted position.

In the preferred embodiment, each shade pole 122 includes three discrete poles nested together so as to be telescopically moved between an elongated position shown in FIGS. 1 and 2 and a nested position as shown in FIG. 10.

The shade device 121 defines a cylindrical, rotary dispensing member 123 with an integrated shade body 124 and folding frame. The dispensing member 123 includes opposing end sections 125 for connecting to one of the shade poles 122. When the shade device 121 is attached to the shade poles 122, the fixed nature of the end sections provides stationary connection about which the dispensing member 123 can rotate. The shade body 124 is integral with the dispensing member 123 such that it can wrap and unwrap around the dispensing member 123 to move between a shading position illustrated in FIGS. 1, 2, and 7 and a wrapped position illustrated in FIGS. 8, 9, and 10.

The folding frame defines two mirror image side frame sections 127, each having a central hinge, and a rigid opposing member 128, with the frame sections 127 connected at one end to the end sections 125 of the dispensing member 123 and at the other end to the opposing member 128. The frame sections 127, along with a pair of diagonal supports 126 hinged to the shade poles 121 and connected to the ends of the opposing member 128, enable the opposing member 128 to move laterally on the same plane as the dispensing member 123. With shade body 124 attached to the opposing member 128, when the opposing member 128 is moved away from the dispensing member 123, it moves the shade body 124 into the shading position, suspended horizontally between the opposing member 128 and the dispensing member 123. Conversely, when the opposing member 128 is moved towards the dispensing member 123, it allows the shade body 124 to retract around the dispensing member 123 and move to its wrapped position.

Figure 7:
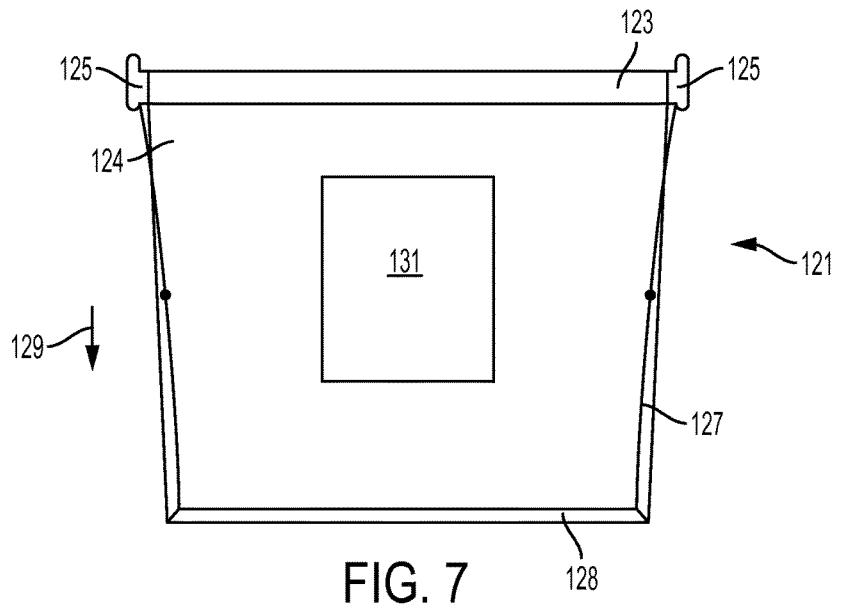
FIG. 7 is a top plan view of a shade device of a fold out fishing chair built in accordance with the present invention shown in a shading position.
Figure 8:
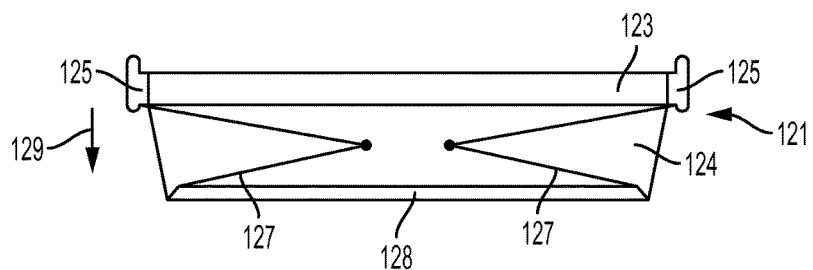
FIG. 8 is a top plan view of a shade device of a fold out fishing chair built in accordance with the present invention shown in a wrapped position.
Figure 9:
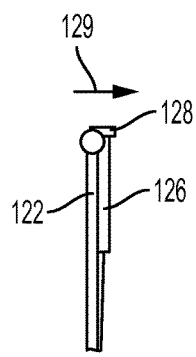
FIG. 9 is a partial side elevational view of a shade assembly of a fold out fishing chair built in accordance with the present invention shown with the shade device in a wrapped position and the shade poles in an elongated position.

In one embodiment, the dispensing member 123 includes an internal spring loaded roller from which the shade body 124 is extended from and around which it wraps. The spring loaded roller biases the shade body 124 to return to the wrapped position such that manual force in a shading direction 129 is required to move the shady body 124 to the shading position and the positioning of the side frame sections 127 linearly, as illustrated in FIG. 7, is required to hold the shade body 124 in the shading position once such manual force has been removed.

In one embodiment, the shade body 124 includes perimeter flaps 124' which extend down around the perimeter of the shade body 124 when in the shading position. Integrated into such flaps are a plurality of LED lighting elements 130 electrically connected to a conventional solar panel 131 positioned on the top of the shade body 124 and an internal battery. It is contemplated that the solar panel 131 is operative to produce electricity from sunlight and the battery stores electricity produced by the solar panel 131 for use by the lighting elements 130. The lighting elements 130 are thereby enabled to selectively provide light using electricity from the battery to supply illumination during lower lighting conditions, such as at night.

Figure 11:
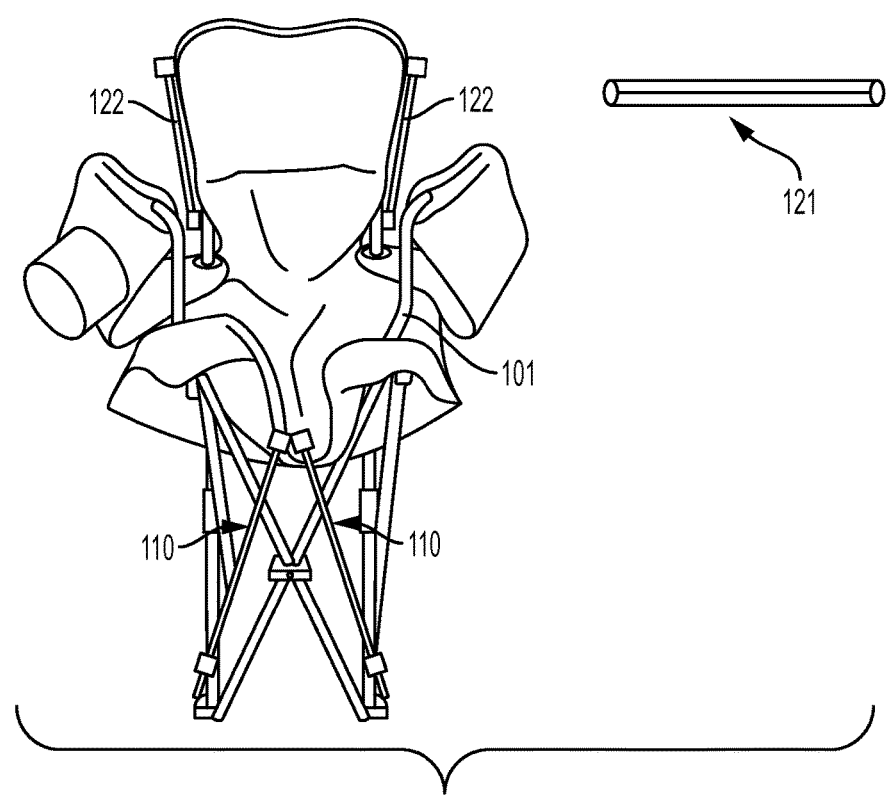
FIG. 11 is a front perspective view of a fold out fishing chair built in accordance with the present invention shown in an partially closed configuration with its shade roller detached and its holder assembly in a retracted position.

Referring now to FIGS. 10 and 11, moving the fold out fishing chair 100 to the closed position requires positioning the holder assembly 110 in its retracted position, moving the shade poles 122 to their nested position, and detaching the shade device 121 from the shade poles 122. With the holder assembly 110 narrowed and adjacent to the legs of the base chair 101 and the shade poles 122 adjacent to the side bars that define the edge of the seat back of the base seat 101, the fold out fishing chair 100 can be folded into its closed configuration sized substantially the same as a folded conventional fold out chair.

The present invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fold out fishing chair, comprising:
    a base seat having at least one front leg and selectively configurable in an open configuration in which it is suitable for a user to be seated as well as a closed configuration suitable for storage and transportation;
    a holder assembly selectively positionable in a retracted position and a deployed position, wherein said holder assembly includes at least one holder extension and at least one rod holder positioned above the at least one holder extension; and
    wherein said holder assembly is connected to said base seat such that the at least one holder extension extends laterally from the bottom of the at least one front leg when in the deployed position and, when the holder assembly is in the deployed position, said at least one rod holder extends from the at least one holder extension at a selected angle and is configured to hold at least one fishing rod upright at the selected angle.

2. The fold out fishing chair of claim 1, wherein said holder assembly includes an integrated tackle box holding net.

3. The fold out fishing chair of claim 1, wherein said holder assembly is configured to hold a plurality of fishing rods.

4. The fold out fishing chair of claim 1, additionally comprising a shade assembly selectively positionable in a retracted position and a deployed position, wherein said shade assembly is attached to said base seat by and adapted to be positioned over the base seat, thereby shading said base seat from direct sunlight.

5. The fold out fishing chair of claim 4, wherein said shade assembly is attached to said base seat by a plurality of discrete telescoping shade poles.

6. The fold out fishing chair of claim 4, wherein said shade assembly includes a roll out shade device operative to enable a shade body to be selectively position in a shading position.

7. The fold out fishing chair of claim 6, wherein said shade device defines a rotary dispensing member and said shade body is configured to unwrap and wrap around the dispensing member to move between the shading position and the wrapped position, respectively.

8. The fold out fishing chair of claim 7, wherein said shade device includes a folding frame attached to the shade body and operative to suspend the shade body horizontally as it extends from the dispensing member when the shade body is in the shading position.

9. The fold out fishing chair of claim 6, wherein said shade assembly is attached to said base seat by at least one telescoping shade pole and the shade device is selectively detachable from said at least one shade pole.

10. The fold out fishing chair of claim 6, wherein the shade device includes at least one lighting element operatively connected to a solar panel and battery.

11. A fold out fishing chair, comprising:
    a base seat having at least one front leg and selectively configurable in an open configuration in which it is suitable for a user to be seated as well as a closed configuration suitable for storage and transportation;

a holder assembly selectively positionable in a retracted position and a deployed position, wherein said holder assembly includes at least one holder extension and at least one rod holder positioned above the at least one holder extension;

wherein said holder assembly is connected to said base seat such that the at least one holder extension extends laterally from the bottom of the at least one front leg when in the deployed position and, when the holder assembly is in the deployed position, said at least one rod holder extends from the at least one holder extension at a selected angle and is configured to hold at least one fishing rod upright at the selected angle; and a shade assembly selectively positionable in a retracted position and a deployed position, wherein said shade assembly is connected to said base seat and adapted to be positioned over the base seat, thereby shading said base seat from direct sunlight.

12. The fold out fishing chair of claim 11, wherein said holder assembly includes an integrated tackle box holding net.

13. The fold out fishing chair of claim 11, wherein said holder assembly is configured to hold a plurality of fishing rods.

14. The fold out fishing chair of claim 11, wherein said shade assembly is attached to said base seat by at least one telescoping shade pole.

15. The fold out fishing chair of claim 14, wherein said shade assembly is attached to said base seat by a plurality of discrete telescoping shade poles.

16. The fold out fishing chair of claim 14, wherein said shade assembly includes a roll out shade device operative to enable a shade body to be selectively position in a shading position.

17. The fold out fishing chair of claim 16, wherein said shade device defines a rotary dispensing member and said shade body is configured to unwrap and wrap around the dispensing member to move between the shading position and the wrapped position, respectively.

18. The fold out fishing chair of claim 17, wherein said shade device includes a folding frame attached to the shade body and operative to suspend the shade body horizontally as it extends from the dispensing member when the shade body is in the shading position.

19. The fold out fishing chair of claim 16, wherein the shade device is selectively detachable from said at least one shade pole.

20. The fold out fishing chair of claim 16, wherein the shade device includes at least one lighting element operatively connected to a solar panel and battery.

* * * * *